United States Patent
Marinus et al.

(10) Patent No.: US 6,445,156 B2
(45) Date of Patent: Sep. 3, 2002

(54) SPEED CONTROL

(75) Inventors: Harry Marinus; Wilhelmus Gerardus Maria Ettes, both of Drachten; Gaatze Bareld Bosma, Kollum; Jacob Dijkstra, Veen Wouden, all of (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 0 days.

(21) Appl. No.: 09/759,040

(22) Filed: Jan. 11, 2001

(30) Foreign Application Priority Data

Jan. 20, 2000 (EP) .............................. 00200221

(51) Int. Cl.[7] .............................. H02P 5/28
(52) U.S. Cl. ................. 318/727; 318/729; 318/808; 318/811; 318/812
(58) Field of Search ................. 318/727, 799, 318/808, 812, 811

(56) References Cited

U.S. PATENT DOCUMENTS

| | | | |
|---|---|---|---|
| 3,611,089 A | 10/1971 | Mokrytzkiet et al. | 318/227 |
| 3,781,614 A | * 12/1973 | Mokrytzki et al. | 318/801 |
| 3,909,687 A | 9/1975 | Abbondanti | 318/227 |
| 4,196,462 A | * 4/1980 | Pohl | 318/430 |
| 4,327,315 A | 4/1982 | Kawada et al. | 318/811 |
| 4,334,182 A | 6/1982 | Landino | 318/808 |
| 4,617,675 A | * 10/1986 | Ashikaga et al. | 318/811 |
| 4,670,698 A | * 6/1987 | Fulton et al. | 318/805 |
| 4,706,180 A | * 11/1987 | Wills | 318/599 |
| 5,252,905 A | 10/1993 | Wills et al. | 318/807 |
| 5,345,160 A | * 9/1994 | Corniere | 318/727 |
| 5,594,670 A | * 1/1997 | Yamamoto | 318/767 |
| 5,828,200 A | * 10/1998 | Ligman et al. | 318/807 |
| 5,883,490 A | * 3/1999 | Moreira | 318/772 |
| 5,969,498 A | * 10/1999 | Cooke | 318/799 |
| 5,990,655 A | * 11/1999 | Escudero | 318/801 |

OTHER PUBLICATIONS

"Compact Front Lighting for Reflective Display", SID 96 Applications Digest, pp. 43–46.

* cited by examiner

*Primary Examiner*—Robert E. Nappi
*Assistant Examiner*—Rita Leykin
(74) *Attorney, Agent, or Firm*—Ernestine C. Bartlett

(57) ABSTRACT

A motor speed control for controlling the speed of an electric induction motor by modulating the amplitude and frequency of the driving voltage. When the load increases the speed control controls the speed so as to be relatively constant with respect to the frequency of the driving voltage. Preferably, the speed control controls the amplitude of the driving voltage in proportion to the square of the frequency.

20 Claims, 4 Drawing Sheets

SPEED CONTROL

BACKGROUND OF THE INVENTION

The invention relates to a speed control for controlling the speed of an electric induction motor by modulating the driving voltage, particularly the amplitude and frequency of this voltage.

Such a speed control is known from United States patent specification U.S. Pat. No. 4,327,315. Said patent specification describes an induction motor in which an LF motor voltage (a voltage of a comparatively low frequency of approximately 1–100 Hz) is obtained by means of an HF pulse width control (pulse width control with a comparatively high frequency of approximately 1–100 kHz). The speed control is then based on the so-called V/f principle. This means that the motor voltage is raised proportionally as the speed (f) increases. In this way, the amount of flux in the motor coil, expressed in V.s (volts second), remains constant and the maximum motor torque remains constant.

In an electric motor the driving voltage builds up a rotating field in the stator, which is followed by the rotor. By modulating the driving voltage the speed of the motor can be influenced. In general, it holds that the speed will increase by increasing the driving voltage and/or by increasing the frequency of the driving voltage. In a no-load condition the rotor will run in synchronism with the rotating field. When loaded the motor rotates at a speed which can be up to approximately 80% as low as the rotating field frequency. An induction motor develops a motor torque only by virtue of a difference in speed of the rotor and the frequency of the rotating field built up between the poles of the stator (the so-called slip). Hereinafter, frequency is to be understood to mean, unless otherwise stated, the frequency of the rotating field built up in the stator, i.e. the frequency of the driving voltage.

The speed assumed under load is referred to as the operating point. When the motor torque is constant this operating point will be shifted toward increasingly lower speeds as the load increases.

Induction motors for electrical appliances are popular in the industry because they can be manufactured comparatively cheaply. However, the possibilities of using motors of this type are limited for uses at lower speeds, particularly in the cases where the load torque at low speeds is comparatively small. As a result of the difference between the motor speed and the rotating field frequency the rotor is alternately accelerated and decelerated in one cycle of the rotating field. The frequency of this pulsation is twice the frequency of the rotating field. As a result of this pulsating torque the motor runs less steadily and produces more noise at lower speeds.

Such a situation occurs, for example, in the case of a fan or a pump. With such appliances the load torque at low speeds is substantially smaller than the motor torque, as a result of which the motor begins to "pound" and no longer runs steadily owing to the pulsating torque and saturation effects. Known speed controls are unsatisfactory in particular in the case that an electric induction motor is used in the fan of an air cleaner. Such an air cleaner feeds the air through a number of cleaning filters at a comparatively low velocity. The sound effects produced by the air stream are then comparatively small. Nevertheless, the noise level produced by the air cleaner owing to the presence of the fan is fairly high. This effect is experienced as annoying.

BRIEF SUMMARY OF THE INVENTION

It is an object of the invention to eliminate said drawbacks and to provide a speed control which makes the electric induction motor run silently and steadily at low speeds. It is another object of the invention to provide an electric motor having such a speed control, which can be manufactured simply and cheaply, particularly for use in a fan or pump. In a speed control of the type defined in the opening paragraph this object is achieved in that the speed control is adapted to control the amplitude V of the driving voltage in accordance with the formula $V=b.f^x$ when the frequency f varies, in which formula x has a value greater than 1 and smaller than 3 and b is a constant.

In a preferred embodiment the value of x is greater than 1.5 and smaller than 2.5, and is preferably 2. This speed control has the advantage that at low speeds the maximum motor torque is much smaller than with the known V/f control, as a result of which the motor runs better and more silently. Since the motor torque is always optimized for the load saturation effects at low speeds are less audible. Harmonic distortion in the rotating field in the stator is less likely to occur, as a result of which the motor is more silent. When an electric motor is used as a fan or pump the load torque is theoretically a square-law function of the speed. This means that the load torque at lower speeds is much smaller than the motor torque of a motor which is operated with a motor voltage proportional to the speed, as is the case in the said United States patent specification. The speed control then controls the amplitude of the driving voltage proportionally to the square of the frequency, as a result of which the value x is 2.

When the speed control is used in an electric motor of an air cleaner this cleaner can operate very silently at lower speeds.

The invention can be used with a multi-phase driving voltage, for example a three-phase driving voltage. However, this type of driving voltage is not customary with motors for domestic uses, particularly with motors for an air-cleaner fan. In addition, the effect is less pronounced in the case of multi-phase driving voltages because at lower speeds these motors operate more steadily anyway. In a preferred embodiment, however, the driving voltage for the motor is a single-phase voltage. Motors with a single-phase driving voltage are very suitable for domestic appliances because they can be manufactured simply and cheaply. In addition, the required power is comparatively low for domestic uses. The use of the speed control in accordance with the invention offers advantages particularly with motors of this type because hitherto these motors were less suitable for low speed drives.

Preferably, the driving voltage is approximately sinusoidal. The rotating field which is built up by said voltage then has a minimal distortion, as a result of which annoying vibration and noise effects are minimal.

For realizing a speed control in accordance with the invention various circuits are conceivable, both in analog and in digital versions. In a preferred embodiment the driving voltage is modulated by pulse width control. This form of modulation makes it possible to modulate high power levels with the aid of power transistors in a comparatively simple manner.

In a further preferred embodiment the pulse width is modulated by the output voltage of a digital signal processor (DSP). A cheap and functional embodiment is then a DSP which supplies an output voltage having at least six discrete voltage levels which approximate a sinewave voltage.

The invention further relates to an electric induction motor having a speed control in accordance with one of the afore-mentioned embodiments.

Although different types of electric induction motors are conceivable in which the invention can be used, the motor preferably has a squirrel-cage armature. In this type of motor there is no electrical connection with the stationary part of the motor, as a result of which the motor is more silent and has a longer lifetime.

In a further preferred embodiment the motor is of the shaded-pole type. In this type a part of the stator is screened, as a result of which an asymmetry in the rotating field is produced. This enables the motor to be started from standstill, without the additional cost of an auxiliary winding or capacitor. The efficiency of a shaded-pole electric motor is comparatively low. However, this need not be a drawback in the case of the comparatively low power ratings required for a fan or air cleaner.

The invention also relates to a fan, a pump or an air cleaner having an electric induction motor in one of the embodiments described herein.

BRIEF DESCRIPTION OF THE SEVERAL VIEWS OF THE DRAWING

The invention will be described in more detail hereinafter with reference to the drawings, in which.

DETAILED DESCRIPTION OF THE INVENTION

Figure 1:
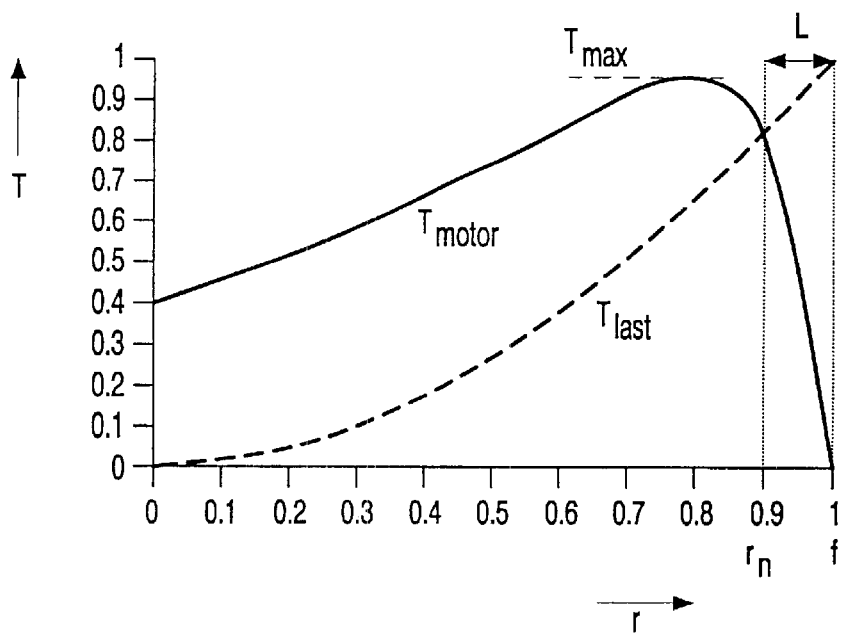
FIG. 1 shows a motor characteristic representing the relationship between speed and motor torque of an electric motor.

Referring to FIG. 1, it will be explained hereinafter how the motor torque $T_{motor}$ of the induction motor develops at an increasing speed and how this is related to the load torque $T_{last}$. In the diagram the speed r is plotted on the horizontal axis as a fraction of the rotating field f and the motor torque $T_{motor}$ and the load torque $T_{last}$ are plotted on the vertical axis as a fraction of the maximum torque $T_{max}$. The load torque $T_{last}$ is shown as a broken line and the motor torque $T_{motor}$ is shown as a solid line. The motor of a fan experiences an increasing resistance owing to the air stream. This results in a load torque $T_{last}$ which increases as the square of the speed r:

$T_{last} = K \cdot r^2$

In this equation K is a constant factor.

In a stationary situation the motor torque $T_{motor}$ and the load torque $T_{last}$ are equal to one another. This equilibrium is reached at the intersection of the load line $T_{last}$ and the motor characteristic and is referred to as the operating point. In this operating point the motor has a speed $r$,. This speed lies between 80–100% of the frequency f of the rotating field. In a stationary situation the following relationship is valid:

$f = a \cdot r_n$

In the equation a is a constant.

At zero load the speed $r_n$ approaches the frequency of the rotating field f and, as consequence, no motor torque is produced. However, if the load torque is increased the operating point is shifted towards a lower speed at which a higher motor torque can be produced. In the operating range L the motor torque increases linearly at a higher load and a lower speed. Outside this range the motor torque increases to a decreasing extent up to the point where the maximum torque is produced; this maximum torque is referred to as the pull-out torque. It can be demonstrated that the maximum torque is inversely proportional to the square of the frequency:

$T_{max} = K \cdot$ Error!

Herein, $T_{max}$ is the maximum torque; V is the motor voltage and f is the frequency thereof (the rotating field frequency); K is a constant factor.

If the motor load is increased even further it is no longer possible to reach equilibrium and the motor has left the linear operating range. It is no longer possible to produce an additional torque. The motor speed will decrease and the motor will stall.

Figure 2:
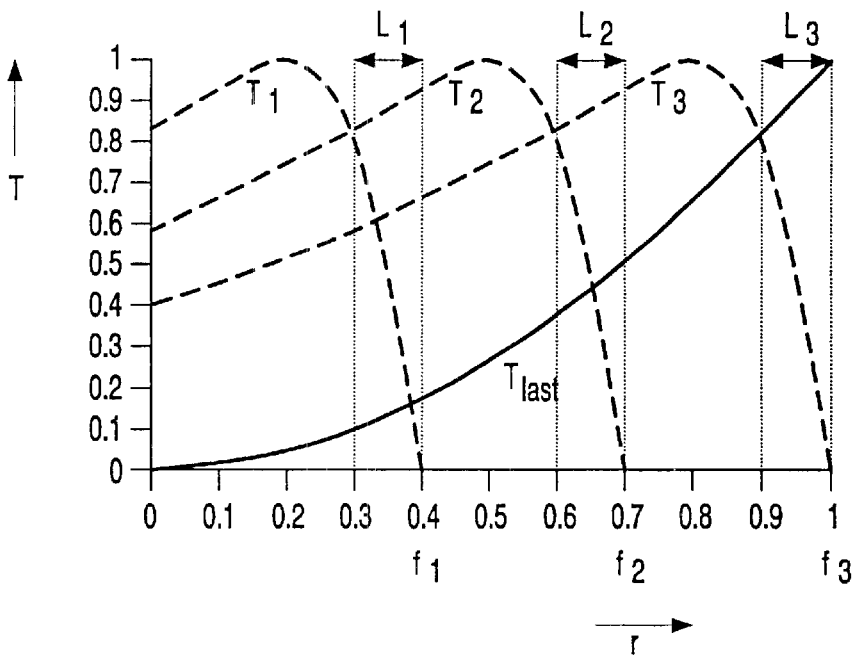
FIG. 2 shows a diagram with motor characteristics in the case of an increasing speed, the amplitude being increased in proportion to the frequency of the motor voltage.

FIG. 2 shows a motor characteristic for a motor, the motor voltage being increased proportionally to the frequency of the rotating field, i.e. speed control is effected in accordance with the V/f principle as described in the patent specification U.S. Pat. No. 4,327,315 mentioned in the introduction. The horizontal axis and the vertical axis represent the same quantities as in FIG. 1. The load torque $T_{last}$ is shown as a solid line; the motor torque is shown in broken lines $T_1$, $T_2$, $T_3$. The operating ranges $L_1$, $L_2$, $L_3$ correspond to increasing rotating field frequencies $f_1$, $f_2$, $f_3$. With this V/f control the amount of flux in the motor coil, expressed in V.s (volts second), and the maximum motor torque remain constant. The linear range shifts along the horizontal axis, without the maximum torque decreasing. However, at lower speeds the maximum torque is much greater than the load torque because this load torque decreases quadratically. Owing to saturation effects upper harmonics of the field then begin to contribute to an annoying noise production, causing the motor to run less silently and less steadily as the speed decreases.

Figure 3:
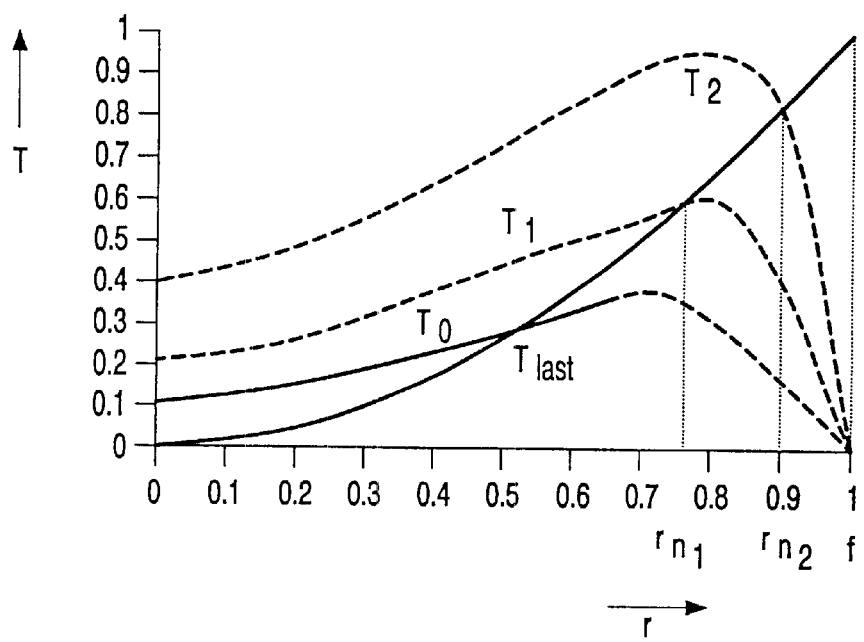
FIG. 3 shows a motor characteristic for an electric motor, the amplitude of the motor voltage being increased and the frequency thereof being maintained constant.

Another method of speed control is a control in which the amplitude of the motor voltage is increased and the frequency thereof is maintained constant; the motor characteristics of such a control are shown in FIG. 3. The horizontal axis and the vertical axis again represent the same quantities as in FIG. 1. The load torque $T_{last}$ is shown as a solid line and the motor torque is shown as broken lines $T_1$, $T_2$. A motor torque $T_1$ is developed at an amplitude $V_1$ of the motor voltage and the motor characteristic $T_2$ is obtained at an amplitude $V_2$. The speed then shifts from $r_{n1}$ to $r_{n2}$ along the load line $T_{last}$. Since the load torque is smaller at lower speeds this method of speed control can be applied over a limited range. However, a drawback of this type of control is that as the voltage is further reduced the operating point will enter the non-linear part of the motor characteristic; this means that the speed control is subject to a lower speed limit.

In the non-linear range an increase of the torque causes the speed to increase, see the curve $T_0$ shown in FIG. 3. In this range stable control of the motor is not possible. On the other hand, the speed cannot be higher than the rotating field frequency f. The control possibilities of a speed control by varying the driving voltage are therefore limited.

Figure 4:
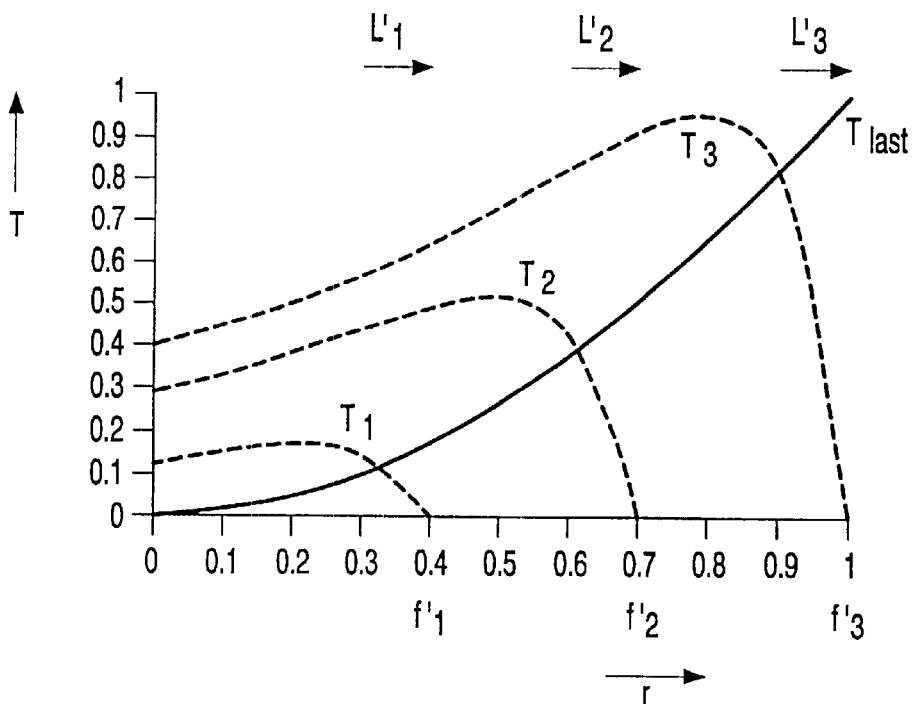
FIG. 4 shows a motor characteristic with a speed control in accordance with the invention.

FIG. 4 shows a motor characteristic for a fan motor for which the motor voltage and motor frequency are controlled by means of a speed control in accordance with the invention. The horizontal axis and the vertical axis represent the same quantities as in FIGS. 1–3. The Figure combines characteristics of FIGS. 2 and 3. For low speeds, at which the resistance presented to the fan is low, the developed motor torque is comparatively small. The load torque increases quadratically as the speed increases. The operating range of the motor is then shifted to operating ranges $L_{1'}$, $L_{2'}$, $L_{3'}$ corresponding to increasing rotating field frequencies $f_{1'}$, $f_{2'}$, $f_{3'}$. By controlling the motor voltage and motor frequency by means of a speed control in accordance with the invention the motor torque now also increases quadratically and the motor keeps operating at approximately the same relative operating point with respect to the frequency of the rotating field.

Expressed as a formula, this is as follows: f=a.r, where a is a constant. If the driving voltage is now chosen in accordance with the formula $V=b.r^2$ the quotient Error!= Error! remains constant.

With this speed control it is achieved that the motor is always loaded in the linear range and the motor is not saturated. The noise production is now substantially smaller than with the conventional speed control.

As FIG. 4 shows clearly, the operating ranges $L'_1$, $L'_2$, and $L'_3$ provide approximately a 3:1 variation in speeds for operation in the respective linear range. Thus the invention permits more than a 2:1 variation in speed while avoiding light load instability.

Figure 5:
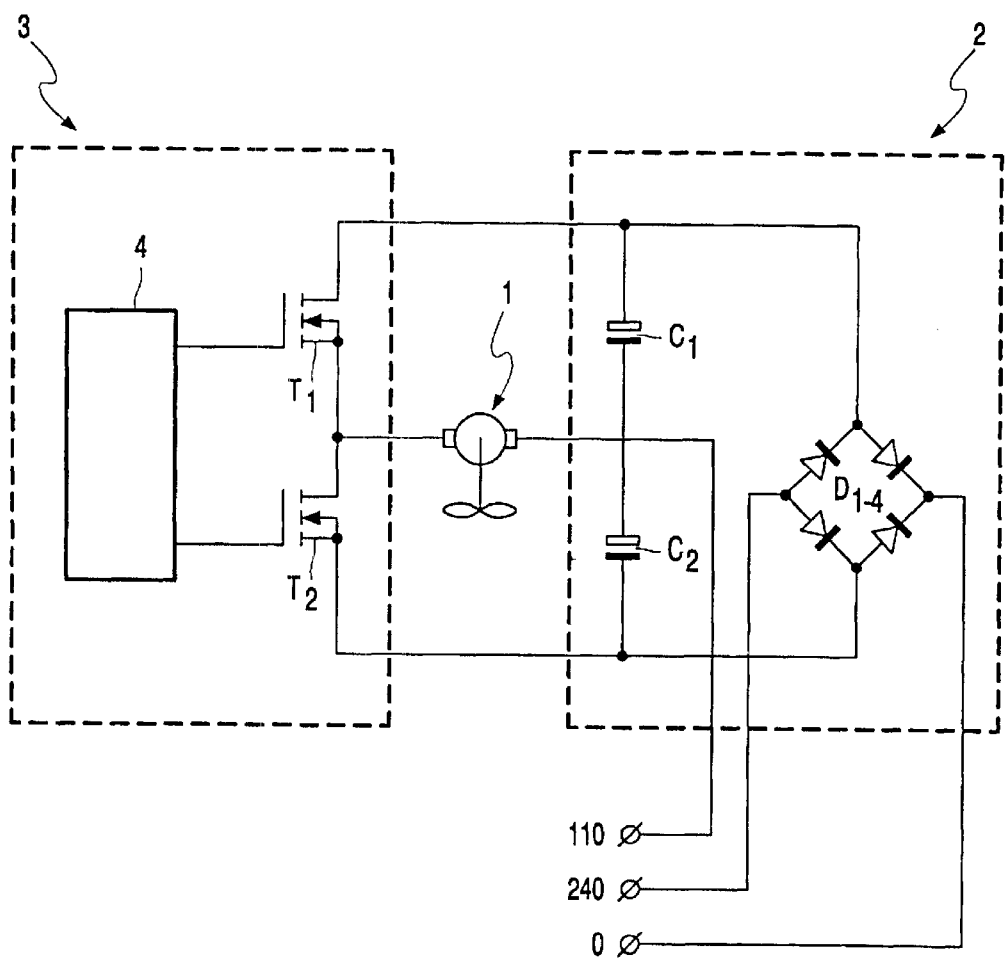
FIG. 5 is a simplified representation of an electronic circuit arrangement including a digital signal processor for controlling an electric motor by means of pulse width modulation.

FIG. 5 shows, merely by way of example, an electronic circuit arrangement for driving an electric induction motor 1 by means of a speed control in accordance with the invention. This so-called half-bridge inverter arrangement is made up of a circuit 2 for direct voltage generation and a pulse width modulation circuit 3.

The circuit 2 has supply voltage terminals 0, 110 and 240 and further includes a Graetz bridge with diodes $D_{1-4}$ and capacitors $C_1$ and $C_2$. The Graetz bridge converts an alternating voltage applied to the supply voltage terminals into a direct voltage across the capacitors. An advantage of this circuit is that it can operate as a voltage doubler. This enables the motor to operate both at mains voltages of 210–240 V (across the terminals 0 and 240) and at a mains voltage of 100–130 V (across the terminals 0 and 110). Such a switching facility is referred to as a "universal mains" because this arrangement allows the motor to be used substantially world-wide.

The pulse-width modulation circuit 3 mainly comprises a microcontroller 4 (a digital signal processor) and two power transistors $T_1$ and $T_2$. The principle of pulse-width modulation is described comprehensively in United States patent specification U.S. Pat. No. 5,252,905. The microcontroller alternately turns on the transistors $T_1$ and $T_2$ at a high frequency (a frequency of approximately 20 kHz). Thus, the electric motor is alternately switched at a high frequency between the positive direct voltage of the capacitor $C_1$ and the negative direct voltage of the capacitor $C_2$. As long as the effective switching period (duty cycle) of the positive and the negative voltage is equal the net driving power of the motor is zero because, as a result of induction phenomena, it cannot follow the high frequency. By modulating the pulse width the duty cycle can be varied and a low frequency effective voltage can be applied to the motor, by means of which the motor can be driven. Both the frequency and the amplitude of this driving voltage is modulated by the microcontroller to realize a speed control in accordance with the invention.

The electric motor 1 has a squirrel cage armature. In a motor of this type there is no electrical connection to the stationary part of the motor, as a result of which the motor is less noisy and has a longer lifetime. In addition, the motor is of the shaded pole type. In this type a part of the stator is screened, as a result of which an asymmetry in the rotating field is produced. This enables the motor to be started from standstill, without the additional cost of an auxiliary winding or capacitor.

Figure 6:
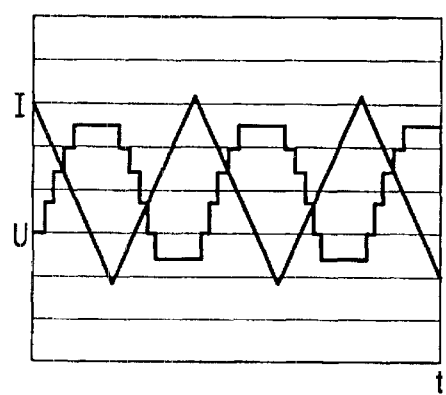
FIG. 6 is a diagram which shows the output voltage of the digital signal processor and the driving voltage applied to the electric motor.

The modulation waveform generated by the microcontroller is preferably sinusoidal, but even simpler waveforms may result in a better and more silent operation of the motor. FIG. 6 shows a diagram in which the output voltage of the digital signal processor is shown as a line U and the current measured in the stator is shown as a line I, both as a function of the time t. For the sake of clarity the motor current I is shown as 90° out of phase with respect to the output voltage U. Although the current waveform is not sinusoidal this six-step trapezoidal waveform is found to exhibit only a slight distortion in comparison with a sinewave. The noise production is proportionately small.

Figure 7:
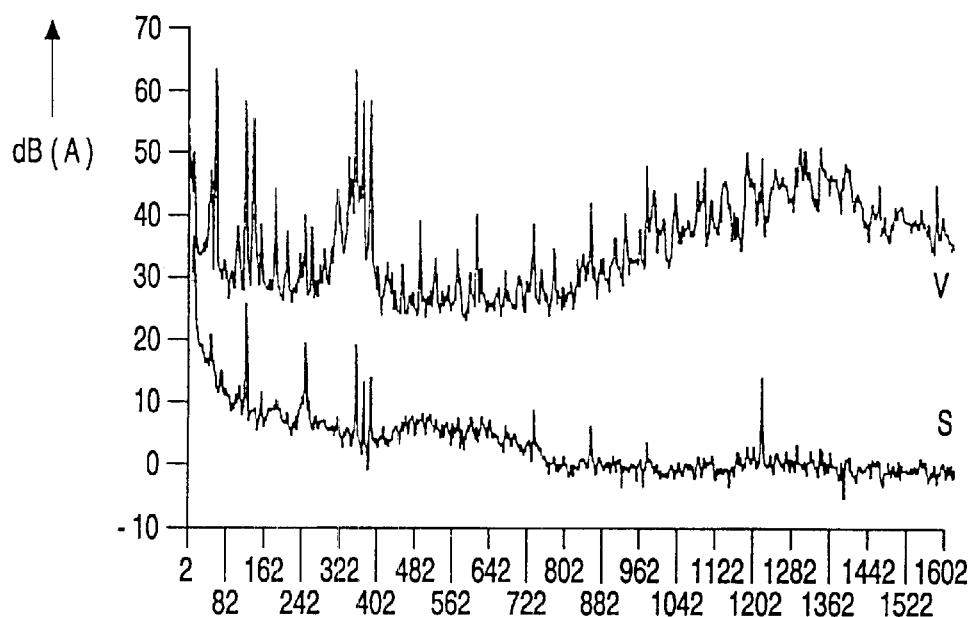
FIG. 7 shows a sound and vibration spectrum of a known air cleaner with a voltage-controlled speed control, at approximately 1000 r.p.m.
Figure 8:
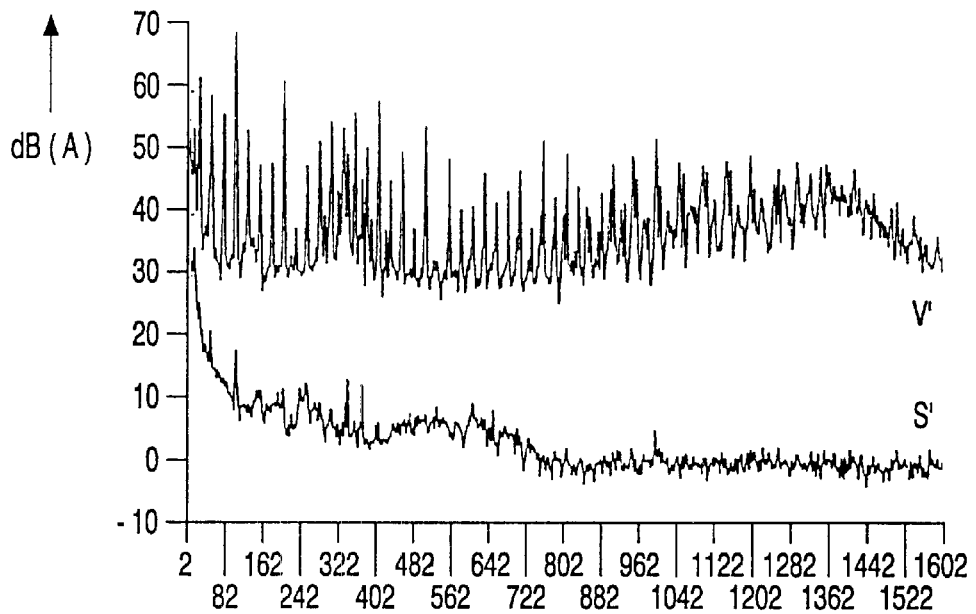
FIG. 8 shows a sound and vibration spectrum of a known air cleaner with a speed control in accordance with the invention, also at approximately 1000 r.p.m.

FIGS. 7 and 8 give results of noise production measurements. FIG. 7 shows a sound and vibration spectrum of an air cleaner with a conventional speed control at the lowest setting at approximately 1000 r.p.m.; FIG. 8 shows a sound and vibration spectrum, also measured at approximately 1000 r.p.m., of an air cleaner having a speed control in accordance with the invention. In FIGS. 7 and 8, the sound is represented by the lines S and S', respectively, and the vibrations by the lines V and V', respectively. The measurements were carried out in an acoustic laboratory. The air cleaner was installed in a so-called "dead room" and the sound spectrum was measured by means of a microphone connected to a spectrum analyzer. This analyzer analyzes the sound into constituent frequency components and displays their intensities corrected for the aural sensitivity curve of the human ear (class A weighted). The microphone was arranged at a distance of 1.20 m from the air cleaner. The vibration spectrum was measured by means of a sensor mounted at the back of the motor for the detection of accelerations.

FIG. 7 shows that peaks occur in the sound and vibration spectrum at certain frequencies. This is particularly so at twice the mains frequency (100 Hz) and the second and third harmonics thereof (at 200–240 Hz and 300–360 Hz, respectively). These are the upper harmonics of the frequency of the pulsating torque, which are produced in the case of distortions of the rotating field in the stator. The frequency of the rotating field is then equal to the mains frequency, which is 50 to 60 Hz. Particularly a tone of approximately 300 Hz is distinctly audible. This tone is the third harmonic. Around the peak of the third harmonic sidebands are situated, which are each spaced from the central frequency by the frequency of the speed. The intensities of the sidebands are influenced by the quality of the motor construction.

As is illustrated in FIG. 8, the use of the speed control in accordance with the invention provides a substantially more favorable sound and vibration spectrum. The motor produces a significantly smaller amount of noise. It is to be noted in particular that the third harmonic of twice the main frequency is absent. The sidebands of these harmonics still persist but to a lesser degree. The vibration spectrum is more uniform than in the conventional situation. A favorable additional effect is that the contribution of these vibrations to the sound intensity is smaller.

What is claimed is:

1. A speed control for controlling the speed of an electric induction motor by modulating the amplitude V and frequency f of the driving voltage of the motor, characterized in that the speed control controls the amplitude V of the driving voltage in accordance with the formula $V=b.f^x$, where x has a value greater than 1 and smaller than 3 and b is a constant.

2. A speed control as claimed in claim 1, characterized in that the value of x is greater than 1.5 and smaller than 2.5.

3. A speed control as claimed in claim 2, characterized in that the driving voltage for the motor is a single-phase voltage, controlled to provide speed variation greater than 2:1 with loading in linear ranges.

4. A speed control as claimed in claim 2, characterized in that the driving voltage for the motor is approximately sinusoidal.

5. A speed control as claimed in claim 1, characterized in that the driving voltage is modulated by pulse width control.

6. A speed control as claimed in claim 5, characterized in that the pulse width is modulated by the output voltage of a digital signal processor.

7. A speed control as claimed in claim 6, characterized in that the digital signal processor supplies an output voltage having at least six discrete voltage levels which approximate a sinewave voltage.

8. A speed control as claimed in claim 2, characterized in that the value of x is approximately 2.

9. A combination of an induction motor for driving a load having a load torque at low speeds substantially smaller than the motor torque at high speeds, and a speed control for varying the speed of the motor by modulating at least one of the amplitude and frequency of the driving voltage of the motor, characterized in that the speed control controls the frequency f of the driving voltage and controls the amplitude V of the driving voltage in accordance with the formula $V=b.f^x$, where x has a value greater than 1 and smaller than 3 and b is a constant.

10. A combination as claimed in claim 9, characterized in that the driving voltage is modulated by the output voltage of a digital signal processor using pulse width control, and supplying an output voltage having at least six discrete voltage levels which approximate a sine wave voltage.

11. A combination as claimed in claim 9, characterized in that the value of x is greater than 1.5 and smaller than 2.5.

12. A combination as claimed in claim 11, characterized in that the value of x is approximately 2.

13. A combination as claimed in claim 11, characterized in that the motor is adapted for driving a load whose torque increases as the square of the speed.

14. A combination as claimed in claim 11, characterized in that the motor is of the shaded-pole type.

15. A device comprising an induction motor, a load coupled to said motor having a load torque at low speeds substantially smaller than the motor torque at high speeds, and a speed control for varying the speed of the motor by modulating at least one of the amplitude and frequency of the driving voltage of the motor, characterized in that the speed control controls the frequency f of the driving voltage and controls the amplitude V of the driving voltage in accordance with the formula $V=b.f^x$, where x has a value greater than 1 and smaller than 3 and b is a constant.

16. A device as claimed in claim 15, characterized in that the driving voltage is modulated by the output voltage of a digital signal processor using pulse width control, and supplying an output voltage having at least six discrete voltage levels which approximate a sine wave voltage.

17. A device as claimed in claim 15, characterized in that the value of x is greater than 1.5 and smaller than 2.5.

18. A device as claimed in claim 17, characterized in that the value of x is approximately 2.

19. A device as claimed in claim 17, characterized in that the load torque of said load increases as the square of the speed.

20. A device as claimed in claim 17, characterized in that the motor is of the shaded-pole type.

* * * * *